C. RITTELMANN.
ANIMAL TRAP.
APPLICATION FILED JAN. 15, 1916.

1,176,778.

Patented Mar. 28, 1916.

WITNESSES

INVENTOR
Christian Rittelmann
BY
ATTORNEYS

UNITED STATES PATENT OFFICE.

CHRISTIAN RITTELMANN, OF NEWARK, NEW JERSEY.

ANIMAL-TRAP.

1,176,778.  Specification of Letters Patent.  Patented Mar. 28, 1916.

Application filed January 15, 1916. Serial No. 72,244.

*To all whom it may concern:*

Be it known that I, CHRISTIAN RITTELMANN, a citizen of the United States, and a resident of Newark, in the county of Essex and State of New Jersey, have invented a new and Improved Animal-Trap, of which the following is a full, clear, and exact description.

The object of the invention is to provide a new and improved animal trap which is very simple and durable in construction, cheap to manufacture, easily set up and arranged to take up very little room to permit of conveniently placing the trap in position at almost any place.

In order to accomplish the desired result, use is made of a base jaw having a rearwardly extending arm, a movable jaw adapted to co-act with the said base jaw and having a rearwardly extending arm fulcrumed on the said base jaw arm, a spring pressing the said movable jaw arm to close the movable jaw, a lever fulcrumed on the rear end of the said base jaw arm and adapted to extend over the said movable jaw arm to about the middle of the movable jaw, and a trigger mounted to swing loosely on the said movable jaw and having at its upper end a catch adapted to engage the free end of the said lever, the said trigger having at its lower end a bait holder depending from the movable jaw.

A practical embodiment of the invention is represented in the accompanying drawings forming a part of this specification, in which similar characters of reference indicate corresponding parts in all the views.

Figure 1:
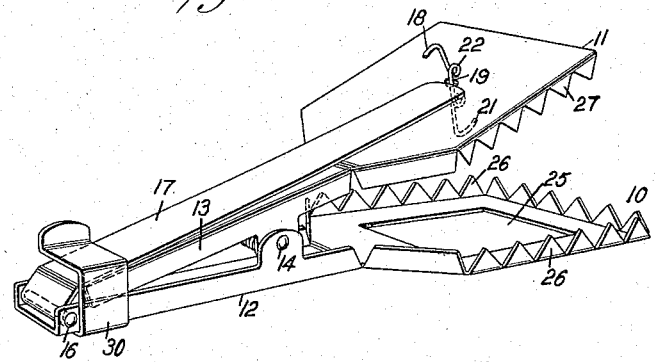
Figure 2:
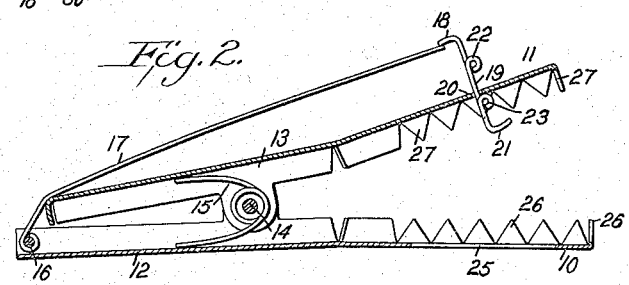
Figure 3:
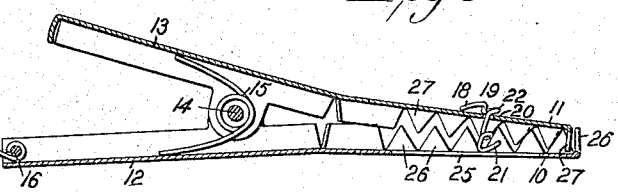
Figure 4:
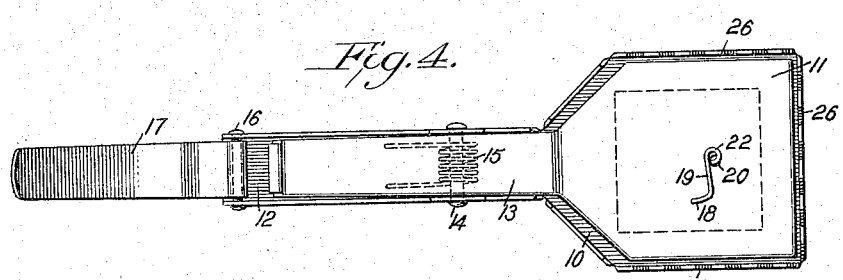

Figure 1 is a perspective view of the animal trap with the temporary retaining clip applied to permit of conveniently setting the trap; Fig. 2 is a sectional side elevation of the animal trap in set position; Fig. 3 is a similar view of the same with the jaws closed; and Fig. 4 is a plan view of the same.

The animal trap in its general construction consists of a base jaw 10 and a movable jaw 11 adapted to coact with the jaw 10 to trap the animal between the jaws. The jaws 10 and 11 are provided with rearwardly extending arms 12 and 13 pivotally connected with each other by a transverse pivot 14 to allow the jaw 11 to swing toward and from the jaw 10. A spring 15 is coiled around the pivot 14 and its ends press against the arms 12 and 13 in the rear of the pivot 14 to cause the jaw 11 to swing toward the jaw 10 on closing of the trap, as hereinafter more fully explained.

The rear end of the base jaw arm 12 is provided with a transverse pivot 16 on which is fulcrumed one end of a lever 17 to bear on the rear end of the arm 13 and extending over the same to about the middle of the movable jaw 11. The free end of this lever 17 is adapted to be engaged by a catch 18 formed on the upper end of a trigger 19 in the form of a piece of wire extending through an opening 20 formed in the movable jaw 11 at or near the middle thereof. The trigger 19 is provided at its lower end with a bait holder 21, preferably in the form of a hook, for supporting the bait intermediate the jaws 11 and 10 at the time the trap is set. The trigger 19 is provided with spaced coils 22 and 23 above and below the jaw 11 to hold the trigger in position on the jaw 11 at the time the trap is set or released, as will be readily understood by reference to Figs. 2 and 3. It will be noticed that the trigger 19 made in the manner described is loosely mounted on the jaw 11 and is thus free to swing in any direction to render the trigger very sensitive, that is, to readily release the lever 17 by disengaging the catch 18 from the free end of the lever 17 on the animal disturbing the bait on the holder 21. In practice, the jaws 10 and 11 are made of tin or other sheet metal and the jaw 10 is provided with a central opening 25 to accommodate the lower portion of the trigger 19 at the time the jaws are in closed position and also to accommodate a portion of the bait of the animal trap. The jaw 10 is provided with marginal upwardly extending toothed flanges 26 and similar flanges 27 depend from the movable jaw 11, but these flanges 27 are adapted to lie within the flanges 26 at the time the jaw 11 is closed, as shown in Figs. 3 and 4. The arms 12 and 13 of the jaws 10 and 11 are provided with flanges to render the said arms exceedingly strong and durable thus insuring long life of the animal trap.

When it is desired to set the animal trap, use is made of a U-shaped clip 30 passed under the arm 12 and over the lever 17 at the fulcrum end thereof and at the time that the arm 13 has been swung forward by the operator pressing on the lever 17 and the arm 13. Thus the jaw 11 is held open to allow the operator to readily engage the catch 18 to free the end of the lever 17 to set the trap, after which the clip 30 is removed. The trap is now set and when the animal disturbs the bait on the holder 21 then the trigger 19 is sufficiently actuated to disengage the catch 18 from the lever 17. The pressure of the spring 15 now causes the jaw 11 to swing downward to trap the animal between the jaws 10 and 11.

From the foregoing it will be seen that the animal trap shown and described is very simple in construction, cheap to manufacture and easily set without danger of injury to the user owing to the fact that the clip 30 safeguards the setting of the trap.

It will be noticed that the mouse or other animal caught between the large square jaws is killed almost instantly and is not liable to be caught only by the tail or a leg and kept in agony until released.

Having thus described my invention, I claim as new and desire to secure by Letters Patent:

1. An animal trap, comprising a base jaw having a rearwardly extending arm, a movable jaw adapted to co-act with the said base jaw and having a rearwardly extending arm fulcrumed on the said base jaw arm, a spring pressing the said movable jaw arm to close the movable jaw, a lever fulcrumed on the rear end of the said base jaw arm and adapted to extend over the said movable jaw arm to about the middle of the movable jaw, and a trigger mounted to swing loosely on the said movable jaw and having at its upper end a catch adapted to engage the free end of the said lever, the said trigger having at its lower end a bait holder depending from the movable jaw.

2. An animal trap, comprising a base jaw having a rearwardly extending arm, a movable jaw adapted to co-act with the said base jaw and having a rearwardly extending arm fulcrumed on the said base jaw arm, the said base jaw having a central opening and upturned marginal toothed flanges, and the said movable jaw having depending marginal toothed flanges adapted to lie within the marginal flanges of the base jaw at the time the jaws are closed, a spring pressing the said movable jaw arm to close the movable jaw, a lever fulcrumed on the rear end of the said base jaw arm and adapted to extend over the said movable jaw arm to about the middle of the movable jaw, and a trigger mounted to swing loosely on the said movable jaw and having at its upper end a catch adapted to engage the free end of the said lever, the said trigger having at its lower end a bait holder depending from the movable jaw.

In testimony whereof I have signed my name to this specification in the presence of two subscribing witnesses.

CHRISTIAN RITTELMANN.

Witnesses:
OMREN LITRANY,
JOHN B. SCHOTT.

Copies of this patent may be obtained for five cents each, by addressing the "Commissioner of Patents, Washington, D. C."